Oct. 31, 1933.                W. H. MORGAN                1,933,333
                      CLEAR VISION DEVICE FOR VEHICLES
                  Original Filed Nov. 30, 1928    3 Sheets-Sheet 1
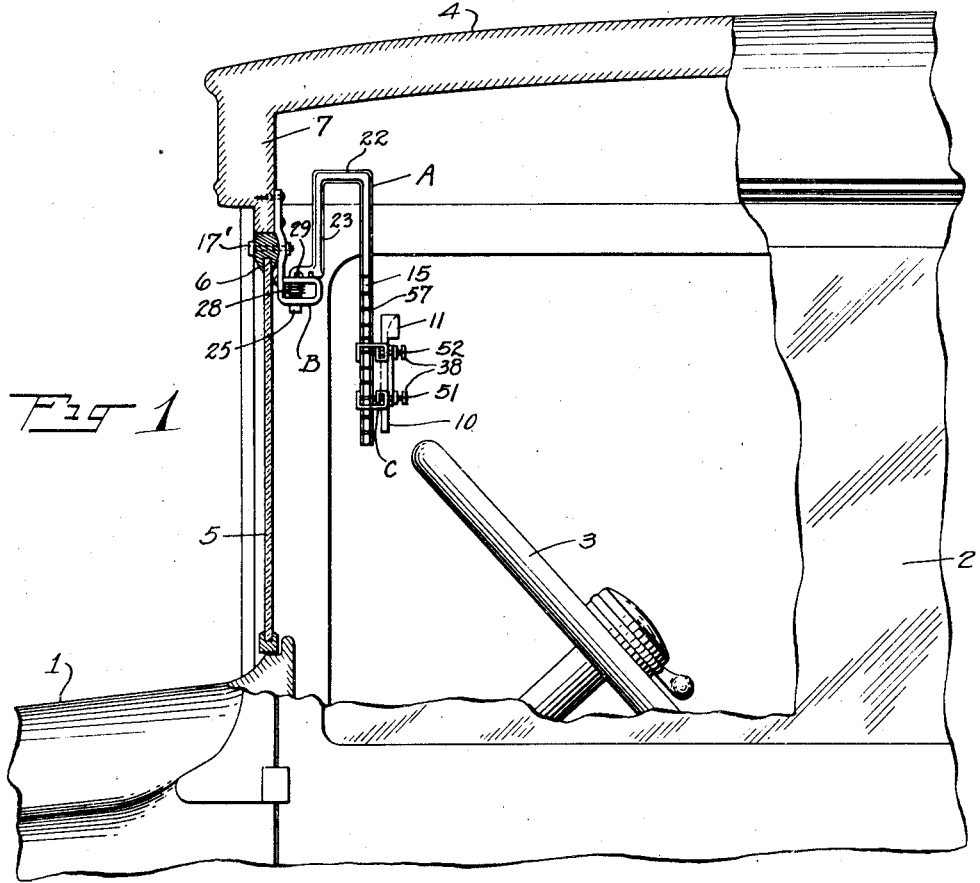
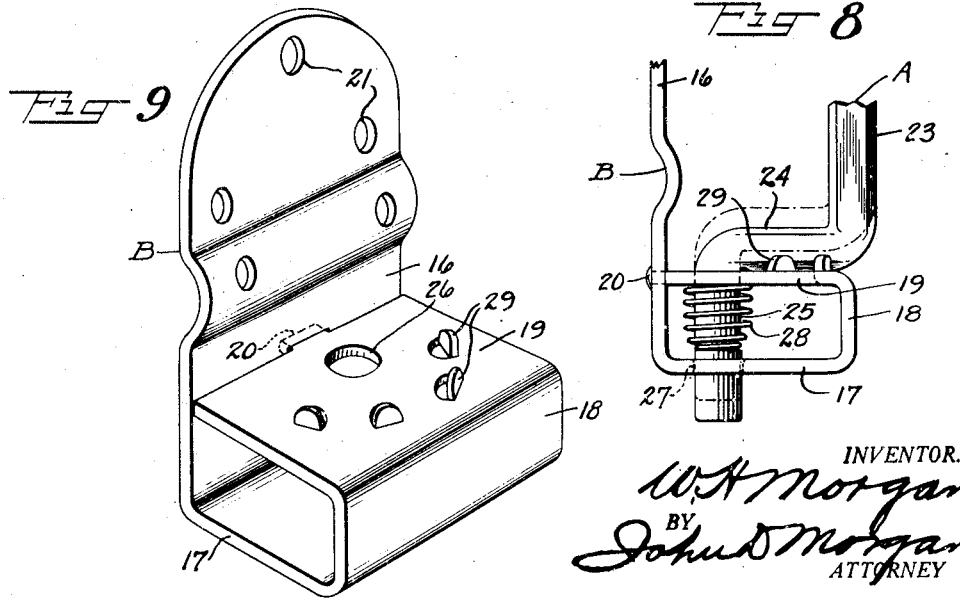
INVENTOR.
W. H. Morgan
BY
John D. Morgan
ATTORNEY

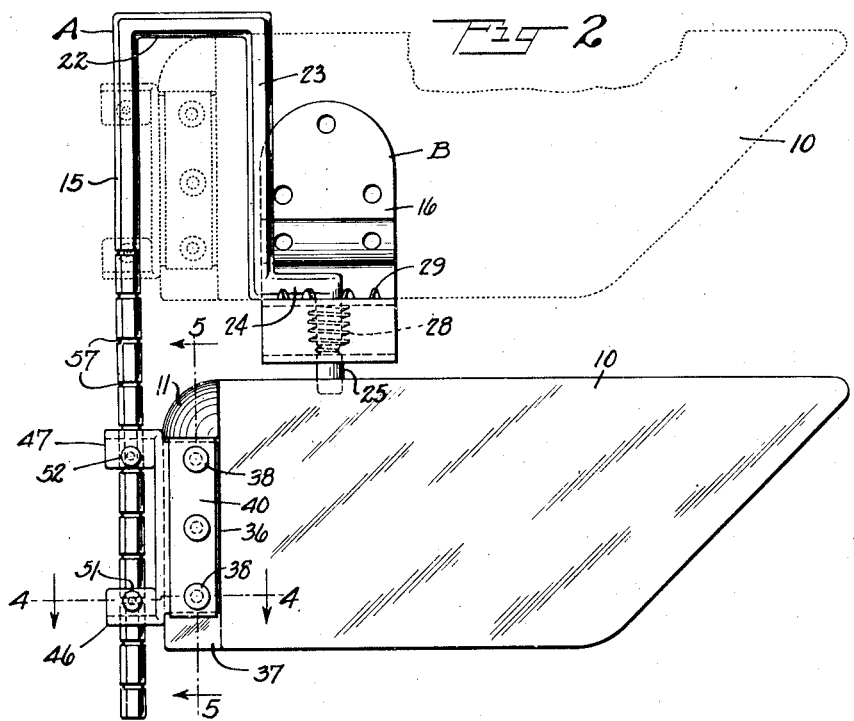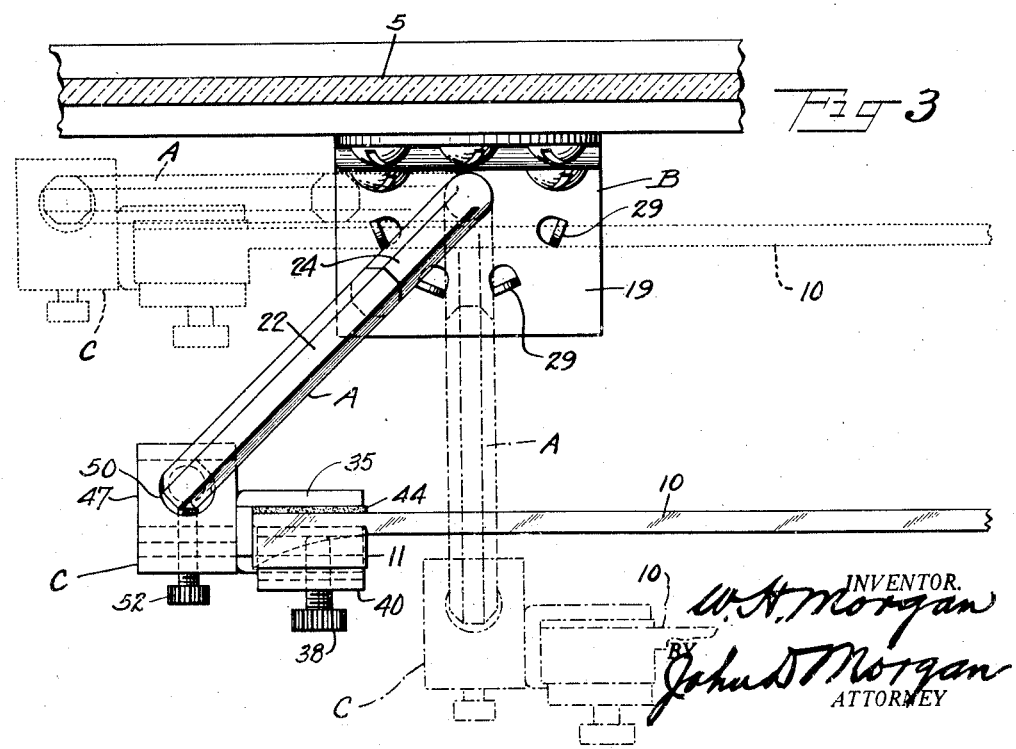

Oct. 31, 1933.   W. H. MORGAN   1,933,333
CLEAR VISION DEVICE FOR VEHICLES
Original Filed Nov. 30, 1928   3 Sheets-Sheet 3
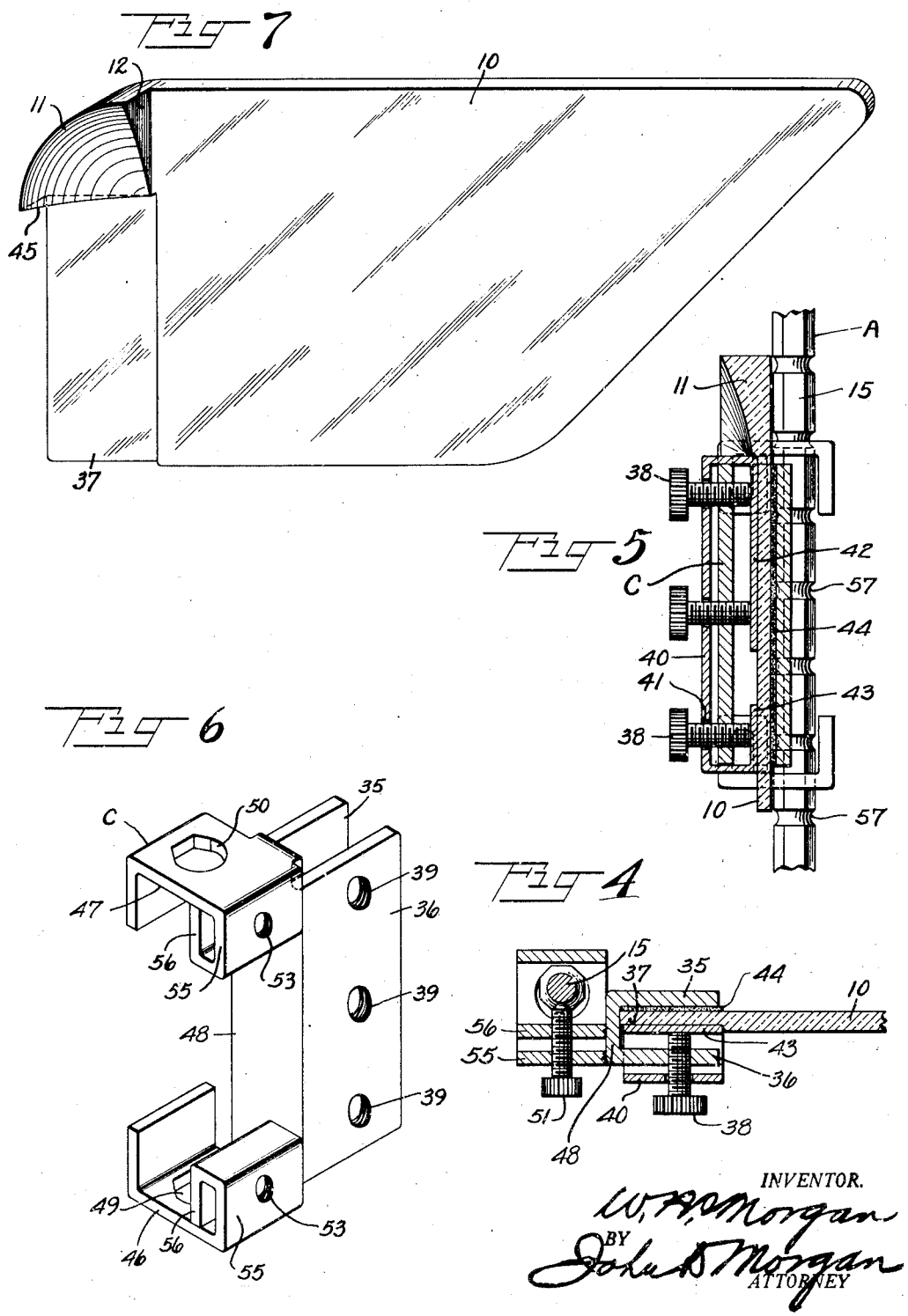

Patented Oct. 31, 1933

1,933,333

UNITED STATES PATENT OFFICE 1,933,333

CLEAR VISION DEVICE FOR VEHICLES

William H. Morgan, Hollidays Cove, W. Va.

Application November 30, 1928, Serial No. 322,733
Renewed March 27, 1933

8 Claims. (Cl. 296—97)

The invention relates to a novel and useful device for facilitating clear vision in the driving of vehicles and more particularly to a combined anti-glare shield and traffic-light detector.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a fragmentary side elevation of a portion of an automobile provided with a preferred embodiment of the invention, certain parts being broken away and certain other parts being shown in vertical section;

Fig. 2 is a fragmentary detailed elevation, looking to the left in Fig. 1, and showing the mechanism embodying the invention;

Fig. 3 is a plan view of the mechanism shown in Fig. 2, but also showing said mechanism as attached to automobiles;

Fig. 4 is a transverse horizontal section taken along line 4—4 of Fig. 2;

Fig. 5 is a transverse vertical section taken along line 5—5 of Fig. 2;

Fig. 6 is a detail perspective view of the glare-shield holding bracket;

Fig. 7 is a perspective view of the combined glare-shield and light deflector of the invention;

Fig. 8 is a fragmentary detailed elevation of the bracket for attaching the mechanism to an automobile; and Fig. 9 is a perspective detail of said attaching bracket.

The invention is directed to providing a novel and very useful device for aiding the drivers of vehicles, particularly automobiles, to have a clear vision of the road at all times while enabling him to keep his eyes on the road at all times by obviating the necessity for turning his head or eyes to see objects normally obscured by opaque portions of the motor car. More specifically the invention is directed to a novel device comprising a combined anti-glare and traffic light detecting device.

One object of the invention is to provide an anti-glare device and mounting therefor which assures the maximum safety to the driver and occupant of the vehicle in case of accident, wreck or shock to the vehicle or part thereof.

The invention is further directed to an improved anti-glare device for protecting the eyes of an automobile driver from the glare of approaching headlights and other sources of light in his line of vision; which will be convenient of operation and simple of installation in any type of automobile now in use; which will provide the maximum protection to the eyes of the driver while occupying the minimum amount of space; which will permit of rapid and easy positioning to accommodate drivers of different heights and to move to and from operating and non-operating positions; and an anti-glare device which is rugged and durable in structure and exceedingly simple and inexpensive of manufacture.

Broadly considered, the preferred embodiment of the invention comprises a translucent anti-glare shield suspended in a substantially vertical plane and in line with the view of the driver of a motor car, the shield being variably positionable both angularly and rectilinearly to accommodate different drivers and driving conditions and for movement to and from its position of use. Combined with the translucent shield and forming an integral part thereof is a prism, lens or other means for deflecting light rays, said means being positioned with respect to the driver's vision and the glare-shield to most advantageously catch and direct traffic signal lights to the eyes of the driver, so that the driver will not have to bend over, look to the side or turn his head to see the signals. It will be clear that the combined effect of the glare-shield and signal-detecting means is highly advantageous, since the functions of each cooperate to facilitate the driver's vision. For instance, when a car is stopped at a crossing awaiting the green light, the driver can keep his eyes on the road ahead, unhindered by the head-lights of vehicles facing him, while the flashing of the green light will be made visible to him by virtue of the combined detector.

It will be understood that the foregoing general description of the present preferred embodiment, and the following detailed description thereof as well, are exemplary and explanatory of the invention but are not restrictive thereof.

Referring now in detail to the present preferred embodiment of the invention, illustrated by way of example in the accompanying drawings, Fig. 1 shows a portion of a typical motor car, having hood 1, door 2, steering wheel 3, general top structure 4, and windshield 5. The windshield may be secured to the car by any suitable frame structure whose top member 6 is secured to the head board 7 of the automobile.

The invention provides means for absorbing or mitigating the glare from oncoming headlights and other sources of bright light in the driver's line of vision, said anti-glare means having combined therewith a device for deflecting or bending light rays whereby objects such as traffic-signal lights, which are usually suspended a considerable distance above the street and thus normally obscured from view by the top or side of the car when the latter is stopped at a street intersection, are brought into the normal range of the driver's vision as he looks at the road ahead. The present preferred embodiment comprises a glare reducing shield or pane 10 composed of transparent or semi-transparent material adapted to eliminate the dazzling glare of bright lights while giving as high a degree of transparency as possible. The shield 10 is preferably suspended by suitable means, to be later more fully described, in the normal line of vision of the driver, being located between the driver and the inner surface of the windshield 5.

Referring to Fig. 7, the anti-glare shield 10 comprises a relatively wide sheet of blown glass, being relatively short in vertical dimension, and having at its upper lefthand corner a quarter segment of a plano-concave lens 11. The lens 11 is preferably formed as an integral portion of the glare-shield, being blown or ground from a thickened shoulder 12 formed in the piece of glass or the like from which the glare shield 10 is made. However, the invention is not limited to a lens formed of the same material or same piece of glass as that of the glare shield, but may be constructed of a separate piece of glass which is affixed to the glare-shield by adhesive or any other suitable means. Furthermore, means other than the lens shown may be used in combination with the glare-shield for effecting the desired result. For instance, the lens 11 may be of different optical structure or a prism or mirror might be used in lieu of the lens shown for deflecting the light rays.

It will be clear that the light-deflecting lens 11 is adapted to render visible objects which are both above and laterally displaced from the normal line of vision of the driver, so that a traffic light which is on the left or right of the car will be readily seen.

In the present preferred embodiment of the invention, the glare-shield is adapted to give protection to the driver's eyes in proportion to the proximity and intensity of the glaring light, while leaving the remainder of the wind-shield free for natural vision unobstructed by the glare-shield. As more fully described in my co-pending application Ser. No. 282,150, filed June 1, 1928, the glare shield is provided with an inclined right-hand edge, sloping downwardly to the left at an angle of about 45° whereby the closest and most blinding lights pass through the wide upper portion of the shield, while the narrower lower portion is sufficient to accommodate more distant lights. The construction described leaves as much of the wind-shield as possible free for natural vision.

Referring now to the mechanism for supporting and permitting variable positioning of the combined glare-shield and lens, the shield is suspended in the driver's line of vision by means of a bracket or arm A having a vertically disposed branch 15 adapted to hang in a vertical plane to the left of the normal line of vision of the driver, the glare-shield being attached to branch 15 and extending laterally therefrom in a plane substantially perpendicular to the line of vision when in its position of use.

The shield-supporting arm A is supported from the head board of the car at a point at or near the top of the wind-shield and is adapted to have angular motion with respect to said point of support whereby the arm and shield may be angularly moved to various positions. As embodied, a bracket B is detachably secured to the car by bolts 17′ passing through cooperating apertures in the windshield frame 6, the bracket being preferably formed of sheet metal or the like and having a flat vertical portion 16, a horizontal bottom 17, a vertical portion 18 and a re-entrant horizontal portion 19 which is provided with a tongue 20 which passes through an aperture in the back portion 16 and is riveted to hold the parts in position. The bracket may be further secured to the car by screws or the like set in the apertures 21 shown in the upper portion of the back 16, although it is usually preferable in practice to use only the bolts 17′, whereby the whole assembly can be readily demounted.

The bracket B, just described, cooperates with the shield-supporting arm A to hold the latter in the desired position. As embodied, the shield supporting arm A is composed of a multangular rod having the vertical branch 15, a short horizontal branch 22, a vertical branch 23, an inwardly turned horizontal branch 24 and a short downwardly extending branch 25. Branch 25 is adapted to pass through apertures 26 and 27 in portions 19 and 17, respectively, of bracket B, the horizontal branch 24 normally lying in contact with the upper face 19 of the bracket. A coil spring 28 serves to hold the branch 24 in normally close relation with the face 19 and prevent rattling and vibration of parts.

As will be clear from the drawings, the shield-supporting arm A is adapted for horizontal angular movement about its support on bracket B. A plurality of struck-up lugs or tongues 29 in the face 19 of the bracket serve to hold the arm in the desired angular position. It will be clear that the horizontal angular positioning of the arm can be quickly and easily accomplished by simply lifting the branch 24 against the force of the spring so as to clear the tops of the lugs 29 and swinging it to any desired position. This operation requires no complicated setting nor unscrewing and tightening of threaded members and can all be accomplished with one hand and without requiring the driver to take his eyes from the road.

While the arm A may be of any suitable material, it is preferably formed of an infrangible and slightly pliable substance, such as tempered rubber or the like. Such construction greatly minimizes danger to the driver and occupants in case of accident or wreck. Furthermore, the slight pliability or yielding quality of the arm makes the setting of clamp screws or the like for holding the shield to the arm 15 a relatively easy matter, since the yielding rubber affords much greater frictional contact to the end of the clamp screw and consequently requires less tightening of the screw. The bracket B, hereinbefore described, may also be formed of similar material if desired, such construction making it possible to either bolt or firmly cement the bracket to the top rail of the windshield or to the headboard of any car.

Referring now to the means for attaching the glare-shield with its deflector lens to the arm 15, a bracket C is provided for connecting the glare-shield to the arm 15 and for permitting angular and rectilinear positioning of the shield with respect to the arm. As will be clear from Figs. 2 and 5, bracket C is provided with a pair of spaced-apart jaws 35 and 36 for holding the left-hand end 37 of glare-shield 10. As shown in Figs. 3 to 5 and 7, the thickness of the shield 10 may be slightly reduced at the end 37 to provide an abutting shoulder for the clamping parts of the jaws of bracket C. As shown in Figs. 4 and 5, the end 37 of the glare-shield is frictionally held between the clamping jaws by means of a plurality of set screws 38 adapted to pass through cooperating apertures 39 in jaw 36. While the set screws may be used to bind the portion 37 directly to the jaws 35 and 36, a U-shaped washer member 40 is preferably provided for substantially surrounding jaw 36, having openings 41 on its outer face for the passage of the set screws 38 and having re-entrant, resilient portions 42 and 43 which lie against the surface 37 of the glare-shield and serve to evenly transmit the binding force of the set screws to the glass. A shock-absorbing padding 44 of felt, rubber or the like may be interposed between the rear face of the glare-shield and the jaw 35. The construction described provides a very effective means for firmly holding the glare-shield to the bracket C while giving the maximum protection against splintering and jarring. It will be noted that the lower projecting surface 45 of lens 11 lies against the upper surface of the clamp washer 40 and cooperates in securely seating the glare-shield in the clamp. As the walls of the glare-shield 10 are usually blown very thin it overcomes all serious danger of injury to occupants in case of accident.

The shield-holding bracket C is adapted to be secured to the arm 15 and to have angular and rectilinear positioning movement with respect thereto. As embodied, two substantially U shaped rod-engaging members 46 and 47 extend from the face 48 between the jaws 35 and 36. Apertures 49 and 50 are provided in the horizontal faces of members 46 and 47 for the passage of arm 15. It will be noted that the arm 15 is shown as octagonal in cross section, while the apertures 49 and 50 are considerably larger in cross-sectional area than is the rod 15. The cross-sections of the apertures are irregular in outline, being partially polygonal and partially curved or circular, the polygonal portion being shaped to conform with three sides of the octagonal arm 15. By virtue of this construction the bracket C can be easily slid up and down the arm 15, while the conforming straight-line surfaces of the arm and apertures provide means for firmly holding the bracket from turning when clamped against the rod.

Means are provided for readily and accurately clamping the members 46 and 47 to the arm 15 comprising set screws 51 and 52 which pass through screw-threaded openings 53 in the walls 55 and 56 of members 46 and 47. The greater part of arm 15 is provided with a plurality of spaced-apart grooves 57 for receiving the rounded end of the clamp screws 51 and 52 and holding them in set position.

By virtue of the construction disclosed, it will be clear that the glare-shield can be readily lowered or elevated along arm 15 and clamped in any desired position according to the wishes or requirements of the driver. Furthermore, the shield can be readily turned about arm 15 as an axis to nicely position the shield and lens in its position of use. Furthermore, it will be clear that the entire ensemble can be swung about the bracket B to flatten the shield against the head board of the car and entirely out of the way of the driver when the mechanism is not being used. A variety of different positions is shown by the full and dotted line view of Figs. 2 and 3.

The invention in its broader aspects is not limited to the specific mechanisms shown and described but departures may be made therefrom within the scope of the accompanying claims without departing from the principles of the invention and without sacrificing its chief advantages.

What I claim is:—

1. A mechanism for facilitating clear vision in driving vehicles including in combination a glare shield for reducing the glare of lights in the driver's line of vision and means on said glare shield for deflecting light rays whereby objects not in the normal range of the driver's vision may be made visible to the driver.

2. A mechanism for facilitating clear vision in driving vehicles comprising a transparent shield for reducing the glare of lights, a portion of said shield being adapted to deflect light rays whereby traffic, signal lights and the like are made visible to the driver.

3. A mechanism for facilitating clear vision in driving vehicles comprising an anti-glare shield of transparent material and a lens formed of a thickened portion of said shield for deflecting light rays to make normally obscured objects visible to the driver.

4. A mechanism for facilitating clear vision in driving vehicles comprising a device for shielding the driver's eyes from glare and having means combined therewith for deflecting light rays to render visible to the driver objects above or to the side of the vehicle which are normally obscured.

5. A mechanism for facilitating clear vision in driving vehicles comprising an anti-glare shield of transparent material and a lens formed of a thickened portion of said shield and located in the upper portion of the shield for deflecting light rays to make normally obscured objects visible to the driver.

6. An anti-glare device for automobile windshields including in combination a windshield, a glare-reducing shield having means for rendering visible to the driver objects which are normally obscured, means for supporting the shield in the driver's line of vision, and means for positioning the shield above the windshield when not in use.

7. An anti-glare device for automobile windshields including in combination a windshield, a glare-reducing shield having means for deflecting impinging light rays whereby traffic-signals or the like are rendered visible to the driver, means for supporting the shield in the driver's line of vision, and means for moving the shield angularly and rectilinearly to vary its position.

8. An anti-glare device for automobile windshields including in combination a windshield, a glare-reducing shield having means for deflecting impinging light rays whereby traffic-signals or the like are rendered visible to the driver, means for supporting the shield in the driver's line of vision, said shield being angularly movable about an upwardly disposed axis and slidable along said axis.

WILLIAM H. MORGAN.